(12) United States Patent
Nichani et al.

(10) Patent No.: US 6,469,734 B1
(45) Date of Patent: Oct. 22, 2002

(54) VIDEO SAFETY DETECTOR WITH SHADOW ELIMINATION

(75) Inventors: Sanjay Nichani, Natick, MA (US); Robert Wolff, Sherborn, MA (US); William Silver, Weston, MA (US); David A. Schatz, Needham, MA (US)

(73) Assignee: Cognex Corporation, Natick, MA (US)

(*) Notice: Subject to any disclaimer, the term of this patent is extended or adjusted under 35 U.S.C. 154(b) by 0 days.

(21) Appl. No.: 09/563,010

(22) Filed: Apr. 29, 2000

(51) Int. Cl.$^7$ .................................................. H04N 7/18
(52) U.S. Cl. ........................................ 348/152; 348/164
(58) Field of Search ............................... 348/143, 150, 348/151, 152–155, 156, 159, 161, 164, 169; H04N 7/18

(56) References Cited

U.S. PATENT DOCUMENTS

| | | |
|---|---|---|
| 4,970,653 A | 11/1990 | Kenue |
| 5,075,864 A | 12/1991 | Sakai |
| 5,208,750 A | 5/1993 | Kurami et al. |
| 5,212,547 A * | 5/1993 | Otsuki .......................... 348/139 |
| 5,301,115 A | 4/1994 | Nouso |
| 5,529,138 A | 6/1996 | Shaw et al. |
| 5,555,312 A | 9/1996 | Shima et al. |
| 5,581,250 A | 12/1996 | Khvilivitzky |
| 5,642,106 A | 6/1997 | Hancock et al. |
| 5,706,355 A | 1/1998 | Raboisson et al. |
| 5,765,054 A * | 6/1998 | Uchiyama .................... 396/100 |
| 5,801,785 A * | 9/1998 | Crump et al. ................ 348/563 |
| 5,917,937 A | 6/1999 | Szeliski et al. |
| 5,956,424 A * | 9/1999 | Wootton et al. ............. 382/192 |
| 5,961,571 A | 10/1999 | Gorr et al. |
| 6,127,926 A * | 10/2000 | Dando ......................... 340/541 |

OTHER PUBLICATIONS

J.H. McClellan, et al., *DSP First—A Multimedia Approach*, Prentice Hall, Section 5: pp 119–152 & Section 8: pp. 249–311.

R.C. Gonzalez, et al., *Digital Image Processing—Second Edition*, Chapter 7: pp. 331–388.

Abstract of U.S. patent 3,686,434, Lemelson, Sep. 22, 1972.
Abstract of U.S. patent 3,816,648, Noll et al., Jun. 11, 1974.
Abstract of U.S. patent 3,858,043, Sick et al., Dec. 31, 1974.
Abstract of U.S. patent 4,198,653, Kamin, Apr. 15, 1980.
Abstract of U.S. patent 4,458,266, Mahoney, Jul. 3, 1984.
Abstract of U.S. patent 5,245,422, Borcherts et al., Sep. 14, 1993.

(List continued on next page.)

*Primary Examiner*—Nhon Diep
(74) *Attorney, Agent, or Firm*—Brian Michaelis

(57) ABSTRACT

A two-dimensional (2-D) machine-vision safety-solution involving a method and apparatus for performing high-integrity, high efficiency machine vision. The machine vision safety solution digitally filters a configurable number of time-sequenced images of a viewed area to create a filtered image. A textured background is used as a static target and viewed under ambient light, or alternatively a texture is observed under IR light. An artificial texture can be created with a particularized pattern. Each new image is then compared to the previously created model and a pixel-oriented difference image is calculated. The difference image is then processed for segmentation features attributable to an intruder object. For segmentation results that exceed a predetermined threshold, an alarm condition is set.

19 Claims, 5 Drawing Sheets

OTHER PUBLICATIONS

Abstract of U.S. patent 5,528,703, Lee, Jun. 18, 1996.
Abstract of U.S. patent 5,577,130, Wu, Nov. 19, 1996.
Abstract of U.S. patent 5,579,444, Dalziel et al., Nov. 26, 1996.
Abstract of U.S. patent 5,589,928, Babbitt et al., Dec. 31, 1996.
Abstract of U.S. patent 5,734,336, Smithline, Mar. 31, 1998.
Abstract of U.S. patent 5,832,134, Aviaash et al., Nov. 3, 1998.
Abstract of U.S. patent 5,870,220, Migdal et al., Feb. 9, 1999.
Abstract of U.S. patent 5,917,936, Katto, Jun. 29, 1999.
Abstract of U.S. patent 5,974,192, Kundu, Oct. 26, 1999.
Umesh R. Dhond et al., *IEEE Transactions on Pattern Analysis and Machine Intelligence*, "Stereo Matching in the Presence of Narow Occluding Objects Using Dynamic Disparity Search", vol. 17, No. 7, Jul. 1995, one page.
*Scientific Technologies Inc.*, "Theory of Operation and Terminology", pp. A50–A54.
*Scientific Technologies Inc.*, "Safety Strategy", pp. A24–A30.
*Scientific Technologies Inc.*, "Safety Standards for Light Curtains" pp. A14–A15.
Web document, "PLS Proximity Laser Scanner Applications", web site: www.sickoptic.com/safapp.htm, picked as of Nov. 4, 1999, 3 pages.
Web document, "New Dimensions in Safeguarding", web site: www.sickoptic.com/plsscan.htm, picked as of Nov. 3, 1999, 3 pages.
Web document, "Special Features", web site: www.sickoptic.com/msl.htm, picked as of Nov. 3, 1999, 3 pages.
Web document, "Capacitive Proximity Sensors", web site: www.theproductfinder.com/sensors/cappro.htm, picked as of Nov. 3, 1999, one page.
Web document, "The Safety Light Curtain", web site: www.theproductfinder.com/sensors/saflig.htm, picked as of Nov. 3, 1999, one page.
Web document, "WV 601 TV/FM", web site: www.leadtek.com/wv601.htm, picked as of Nov. 9, 1999, 3 pages.
Web document, "Product Information", web site: www.imagraph.com/products/IMAproducts–ie4.htm, picked as of Nov. 9, 1999, one page.
Web document, "FlashPoint 128", web site: www.integraltech.com/128OV.htm, picked as of Nov. 9, 1999, 2 pages.
Web document, "Compatible Flame Grabber List", web site: www.masdkodak.com/frmegrbr.htm, picked as of Nov. 9, 1999, 6 pages.
Umesh R. Dhond et al., *IEEE Transactions on System*, "Structure from Stereo—A Review", vol. 19, No. 6, Nov./Dec. 1989.
S.B. Pollard, et al., *Perception*, :PMF: A Stereo Correspondence Algorithm Using a Disparity Gradient Limit, 14:449–470; 1985.
L. Vincent, et al., *IEEE Transactions on Pattern Analysis and Machine Intelligence*, "Watersheds in Digital Spaces: An Efficient Algorithm Based on Immersion Simulations", 13(6):583–598, 1991.

* cited by examiner

VIDEO SAFETY DETECTOR WITH SHADOW ELIMINATION

FIELD OF THE INVENTION

The present invention relates to safety/security systems, and more particularly to an automated system for observing an area for objects intruding upon a safety/security zone.

BACKGROUND OF THE INVENTION

Industrial safety requires protection of operators, maintenance personnel, and bystanders from potential injuries from hazardous machinery or materials. In many cases the hazards can be reduced by automatically sounding an alarm or shutting off a process when dangerous circumstances are sensed, such as by detection of a person or object approaching a dangerous area. Industrial hazards include mechanical (e.g., crush, shear, impalement, entanglement), toxic (chemical, biological, radiation), heat and flame, cold, electrical, optical (laser, welding flash), etc. Varying combinations of hazards encountered in industrial processing can require numerous simultaneous safeguards, increasing capital expenses related to the process, and reducing reliability and flexibility thereof.

Machine tools can be designed with inherent safety features. Alternatively, hazards of machines or materials may be reduced by securing an enclosed machine or portions of the adjacent processing area during hazardous production cycles. Mechanical switches, photo-optical light-curtains and other proximity or motion sensors are well known safety and security components. These types of protection have the general disadvantage of being very limited in their ability to detect more than a simple presence or absence (or motion) of an object or person. In addition, simple sensors are typically custom specified or designed for the particular machine, material, or area to be secured against a single type of hazard. Mechanical sensors, in particular, have the disadvantage of being activated by unidirectional touching, and they must often be specifically designed for that unique purpose. They cannot sense any other types of intrusion, nor sense objects approaching nearby, or objects arriving from an unpredicted direction. Even complicated combinations of motion and touch sensors can offer only limited and inflexible safety or security for circumstances in which one type of object or action in the area should be allowed, and another type should result in an alarm condition. Furthermore, such increased complexity reduces reliability and increases maintenance costs—a self-defeating condition where malfunctions can halt production.

It is known to configure a light curtain (or "light barrier") by aligning a series of photo-transmitters and receivers in parallel to create a "curtain" of parallel light beams for safety/security monitoring. Any opaque object that blocks one of the beams will trigger the photo-conductive sensor, and thus sound an alarm or deploy other safety measures. However, since light beams travel in straight lines, the optical transmitter and receiver must be carefully aligned, and are typically found arranged with parallel beams. These constraints dictate that light curtains are usually limited to the monitoring of planar protection areas. Although mirrors may be used to "bend" the beams around objects, this further complicates the design and calibration problems, and also reduces the safe operating range.

One major disadvantage of a light-curtain sensor is that there is a minimum resolution of objects that can even be detected, as determined by the inter-beam spacing. Any object smaller than the beam spacing could penetrate the "curtain" (between adjacent beams) without being detected. Another disadvantage is that the light curtain, like most point-sensors, can only detect a binary condition (go/no-go) when an object actually interrupts one or more beams. Objects approaching dangerously close to the curtain remain undetected, and a fast-moving intruding object might not be detected until too late, thus forcing the designers to physically position the curtains farther away from the danger areas in order to provide the necessary time-interval for activating safety measures. For large machines this would deny access to large adjacent areas, or require physical barriers or other alarm sensors to provide the requisite security. In addition, the safe operating range between the photo-transmitter and corresponding receiver can be severely limited in cases where chips, dust, or vapors cause dispersion and attenuation of the optical beam, or where vibrations and other machine movements can cause beam misalignment.

Furthermore, light curtains are susceptible to interference from ambient light, whether from an outside source, or reflected by a nearby object. This factor further limits the applications, making use difficult in locations such as outdoors, near welding operations, or near reflective materials. In such locations, the optical receivers may not properly sense a change in a light beam. Still further, light curtains are often constructed with large numbers of discrete, sensitive, optical components that must be constantly monitored for proper operation to provide the requisite level of safety without false alarms. It is axiomatic that system reliability is reduced in proportion to the number of essential components and the aggregation of their corresponding failure rates. Microwave curtains are also available, in which focused microwave radiation is sent across an area to be protected, and changes in the energy or phasing at the distant receiver can trigger an alarm event. Microwave sensors have many of the same disadvantages of light curtains, including many false alarm conditions.

Ultrasonic sensor technologies are available, based upon emission and reception of sound energy at frequencies beyond human hearing range. Unlike photoelectric sensing, based upon optically sensing an object, ultrasonic sensing depends upon the hardness or density of an object, i.e., its ability to reflect sound. This makes ultrasonic sensors practical in some cases that are unsuitable for photoelectric sensors, however they share many common disadvantages with the photoelectric sensors. Most significantly, like many simple sensors, the disadvantages of ultrasonic sensors include that they produce only a binary result, i.e., whether or not an object has sufficiently entered the safety zone to reach a threshold level. Similar problems exist for passive infrared sensors, which can only detect presence or absence of an object radiating heat, typically based upon pyroelectric effects, that exceeds a predetermined threshold value. Such heat sensors cannot be used effectively near machines that generate heat or require heat, or where ambient sunlight may interfere with the sensor.

Video surveillance systems having motion detection sensors are also known for automatically detecting indications of malfunctions or intruders in secured areas. These types of known sensors are limited to the simple detection of change in the video signal caused by the perceived movement of an object, perhaps at some pre-defined location (e.g., "upper left of screen"). Analog video surveillance systems are susceptible to false alarms caused by shadows coming into view that cannot be distinguished from objects.

In addition, it is difficult to use these systems for monitoring of a precise area, since the guarded area should be as small as possible. Also, video motion detectors for surveillance are mounted with a perspective on the viewed scene making it difficult to set precise zones. There is typically also a non-uniform detection capability across the scene. Video motion detectors can be useful for general surveillance operations, but the stringent requirements against false positives and false negatives (missing something) do not permit their use for safety devices.

Furthermore, in video motion detectors available in the prior art, a low-contrast object can enter the area without triggering an alarm. Such systems also require sufficient ambient light to uniformly illuminate the target area in order to properly view the intruding objects. Additional lighting can cause its own problems such as reflections that affect the workers, machines or other sensors, or cause shadows that impinge upon adjacent safety areas and cause false alarms. These and other disadvantages restrict the application of analog video surveillance systems, like the mechanical switch sensors, to simple applications, or where combined with other sensor types.

More recently, proximity laser scanners (PLS) have been used to detect objects within a defined area near the PLS sensor. These systems are also known as Laser Measurement Systems (LMS). The PLS technology uses a scanning laser beam and measures the time-of-flight for reflected light to determine the position of objects within the viewing field. A relatively large zone, e.g., 50 meter radius over 180 degrees, can be scanned and computationally divided into smaller zones for early warnings and safety alarm or shutdown. However, like many of the other sensor technologies, the scanning laser systems typically cannot distinguish between different sizes or characteristics of objects detected, making them unsuitable for many safety or security applications where false alarms must be minimized.

Significantly, the scanning laser systems typically incorporate moving parts, e.g., for changing the angle of a mirror used to direct the laser beam. Such moving parts experience wear, require precision alignment, are extremely fragile and are thus unreliable under challenging ambient conditions. Even with a system that uses fixed optics for refraction or diffraction fields, the components are fragile and susceptible to mis-alignment. Another disadvantage of such systems is that they generally have a flat field of view that must be arranged horizontally to protect an adjacent floor area. This leads to multiple problems, including being susceptible to physical damage or bumping, which increases false alarms and maintenance. Furthermore, the protected area is theoretically infinite, thus requiring the use of solid objects or screens to limit the protected area for applications near other moving objects.

3-D video safety implementations are known. In such implementations, stereopsis is used in determining a 3-D location of an object with respect to cameras, or a defined reference point. A 3-D difference can then be derived and compared with a model view. However, to locate objects in 3-D space requires a binocular (or trinocular) image set. It also may increase the cost and maintenance of equipment. In addition, 3-D calculations for matching and determining alarms conditions may be time consuming. For an application where the camera is mounted overhead to view a target, the area within view is conical and the first part of a person coming into view would be very close to the floor (i.e., the feet), making it more difficult and error-prone to quickly detect as a height difference above the floor. To obtain the necessary coverage, the cone needs to be larger, the camera needs to be higher from the floor, and the image resolution is thus disadvantageously diminished. With the larger cone of vision, the potential false alarm rate is also increased. These disadvantages may accumulate to such an extent that the system is not reliable enough for use in applications for protecting severe hazards where false alarms or false positives cannot be tolerated.

SUMMARY OF THE INVENTION

The present invention provides a two-dimensional (2-D) machine-vision safety-solution involving a method and apparatus for performing high-integrity, high efficiency machine vision. A 2-D video data image of the background in an empty safety zone is captured over time. Each data element of sequentially captured images is compared with corresponding elements of a digitally filtered image of a number of previous captures, in order to determine the cumulative magnitude of contiguous changes. The resulting image is segmented to group areas that are contiguous features. These areas are further processed to discriminate shadows from objects by comparing the changed features of the observed surface against the previously observed features of the vacant background in the safety zone. Further processing results in rapid identification of alarm conditions in accordance with prescribed criteria. To further eliminate shadows, a monochromatic source of illumination can be located near the camera to illuminate the protected area centrally, and by applying a band-pass filter on the sensing device.

An object, multiple objects, or an area being monitored are collectively called the "target" for purpose of discussion. The target is being protected from encroachment by another foreign object, called the "intruder."

According to the invention, the 2-D machine-vision safety-solution apparatus includes an image acquisition device such as one or more video cameras, or digital cameras, arranged to view light reflected from a target scene, such as a safety zone near a dangerous machine. The cameras pass the resulting video output signal to a computer for further processing. The video output signal is connected to the input of a video processor adapted to accept the video signal, such as a "frame grabber" sub-system. Time-sequenced video images from the camera are then synchronously sampled, captured, and stored in a memory associated with a general-purpose computer processor. The digitized image in the form of pixel information can then be stored, manipulated and otherwise processed in accordance with capabilities of the vision system. The digitized images are accessed from the memory and processed according to the invention, under control of a computer program. The results of the processing are then stored in the memory, or may be used immediately to activate other processes and apparatus adapted for the purpose of taking further action, depending upon the particular industrial application of the invention.

In further accord with the invention, the machine-vision safety solution method and apparatus involves storing not only a fixed number of previous captured images in a memory buffer, but also storing a previous filtered output image. A filtered image is created by taking the buffered samples of the video scene and running them through a pixel-oriented low-pass filter. A low-pass filter is designed to prevent high-frequency noise, such as vibrations and flickering light, from creating changes in the filtered image. Each pixel is digitally filtered against the corresponding pixel over a predetermined number of prior images. The filtered image is then compared with each new image to be tested to determine if there have been any sudden changes in the image of the viewed area, the combination thus operating as a high-pass filter. Changes detected by the high-pass filter are then processed to determine if there is a large cumulative magnitude of contiguous changes. A change large enough to exceed a threshold level results in an alarm condition being reported.

Determining the size of the cumulative magnitude of contiguous changes is carried out by using a segmentation step. Segmentation refers to the process of identifying pixels forming a contiguous line segment ("edge") or contiguous area ("blob"), and characterizing such segments according to their location, size and orientation. Further processing of the resulting segments is much faster than processing individual pixel data. Segmentation may be performed using a "watershed" process which quickly determines the location and size of a change by "filling in" valleys that appear between change gradients of the received gray-scale values in the change image.

When using ambient light as the light source on the protected area, shadows of objects outside of the protected area may fall within the viewed perimeter. These shadows can be misinterpreted as intruders and cause false alarms. In one alternative embodiment, a strong but diffused light source located near the camera is used. This arrangement tends to avoid confusion of shadows for an object, since only shadows of objects within the observed area would be visible, provided the system light source is sufficiently strong with respect to ambient light sources reaching the target area. This also reduces the chances that an object might penetrate a poorly lit portion of the target area without triggering a visible change.

In another alternative embodiment, the light source located near the camera produces a diffused light in the near-infrared (IR) spectrum, and the camera lens is filtered to attenuate light at other wavelengths. Image capture, filtering, and blob segmentation and detection are then carried out as above. This arrangement improves the rejection of ambient shadows, especially where ambient light is fluorescent rather than incandescent or natural light having substantial unfiltered components near IR. This embodiment is also relatively simple and processing is relatively fast. The self-contained lighting arrangement also increases the ability to detect intruders where ambient light does not provide adequate uniform light for object detection.

In another alternative embodiment, a textured background is used as a static target and viewed under ambient light to create an artificial contrast with respect to intruding objects. Images are captured and filtered for high-pass and low-pass outputs. In addition, a gradient image is computed directly from the present digitized image source. The segmentation step is then performed on the output of the high-pass filter to create a mask image. Edge-detection is then implemented by masking the output of the low-pass filter, and calculating edges in the low-pass filtered image. These edges are then compared to the gradient image. The result is then processed to detect sudden changes in the texture being viewed. When an intruding object comes between the textured background and the camera the detected texture of the intruder is highly likely to be different from that of the background. This implementation provides superior rejection of changes caused by ambient shadows falling on the target. It also reduces the chances that the system will fail to notice an object having low contrast with respect to the background, since the texture creates an artificial contrast against which most intruder objects will be plainly distinguishable.

In another alternative embodiment, in addition to the textured background described above, the system includes a light source located near the camera producing a diffused light in the near-infrared (IR) spectrum, and the camera lens is filtered to attenuate light at other wavelengths. Since near-IR light behaves like visible light, the same texture decorations can be used as above for use with ambient light or overhead light. Alternatively, texture can be implemented using inks or paints that fluoresce under near-IR but remain invisible in ambient light. In addition to the advantages described above, this implementation reduces the problems caused by insufficient ambient light.

In another alternative embodiment, the light source located near the camera produces a modulated light in the near-infrared (IR) spectrum, and the camera lens is filtered to attenuate light at other wavelengths. Two channels of source images are collected nearly simultaneously and filtered: one with the IR light on, and one with ambient light only. Each channel results in a difference image and the difference between the two difference images is calculated and processed for segmentation. Interference such as shadows will occur in both channels and be cancelled out. The result is then used to determine whether a viewed change is due to an object or a shadow of a non-intruding object, since only an object within the perimeter would cause a change under the IR source. Another way to implement the two image channels is to use two separate cameras: one filtered to reject all but near-IR light and one for receiving images under ambient light. Although it requires additional equipment, this implementation would eliminate the ambient shadow problem while also reducing noise that could cause false alarms.

One of the major advantages of the 2-D video motion detector implemented according to the invention is its geometry. By looking top-down on a scene where intruders may enter, there are several advantages:

(i) the background in the scene can be controlled since the camera is looking at the floor. This gives more control over the contrast problem;

(ii) a single camera-lighting fixture could be used such that the whole area is uniformly lit and viewed. Therefore, the detection capability (sensitivity) is uniform across the target area. This makes the arrangement less susceptible to problems caused by shadows;

(iii) it allows the setting of precise target regions that need to be protected. This is done either using visible markers on the floor during a setup procedure or by a grhic user interface overlaid on the image; and (iv) the entire area can be viewed. If the camera were mounted to one side or on the hazardous machinery itself, it would not be possible to obtain 180-degree coverage due to the viewable cone of the camera lens.

Intruding objects can be determined according to the invention without using sensors that must be specially designed, placed, or calibrated for each different type of object to be protected. The system does not rely upon any moving mechanical parts subject to the rigors of wear and tear. It is not necessary for the invention to be placed very close to, or in contact with the hazard, as would be necessary for mechanical sensors. Machine vision systems offer a superior approach to security and safety sensors by processing images of a scene to detect and quantify the objects being viewed. Machine vision systems can provide, among other things, an automated capability for performing diverse inspection, location, measurement, alignment and scanning tasks.

Another feature of at least some embodiments of the invention is the ability to discriminate shadows from objects, to avoid false alarms. Similarly, when using its own light source, the system provides greater shadow immunity. In addition, the use of a near-IR light source offers the feature of additional illumination without the drawbacks of visible light, such as reflections. Similarly, near-IR is completely invisible and can be operated in what would otherwise appear to humans to be total darkness. When using a textured background, the system overcomes disadvantages caused by low-contrast intruders. Another feature of the invention is the ability to automatically store (and archive) digitized images of the scene in which an infraction of the safety or security rules existed, for later review.

BRIEF DESCRIPTION OF THE DRAWINGS

These and other features of the present invention will be better understood in view of the following detailed description taken in conjunction with the drawings, in which.

DETAILED DESCRIPTION

Figure 1:
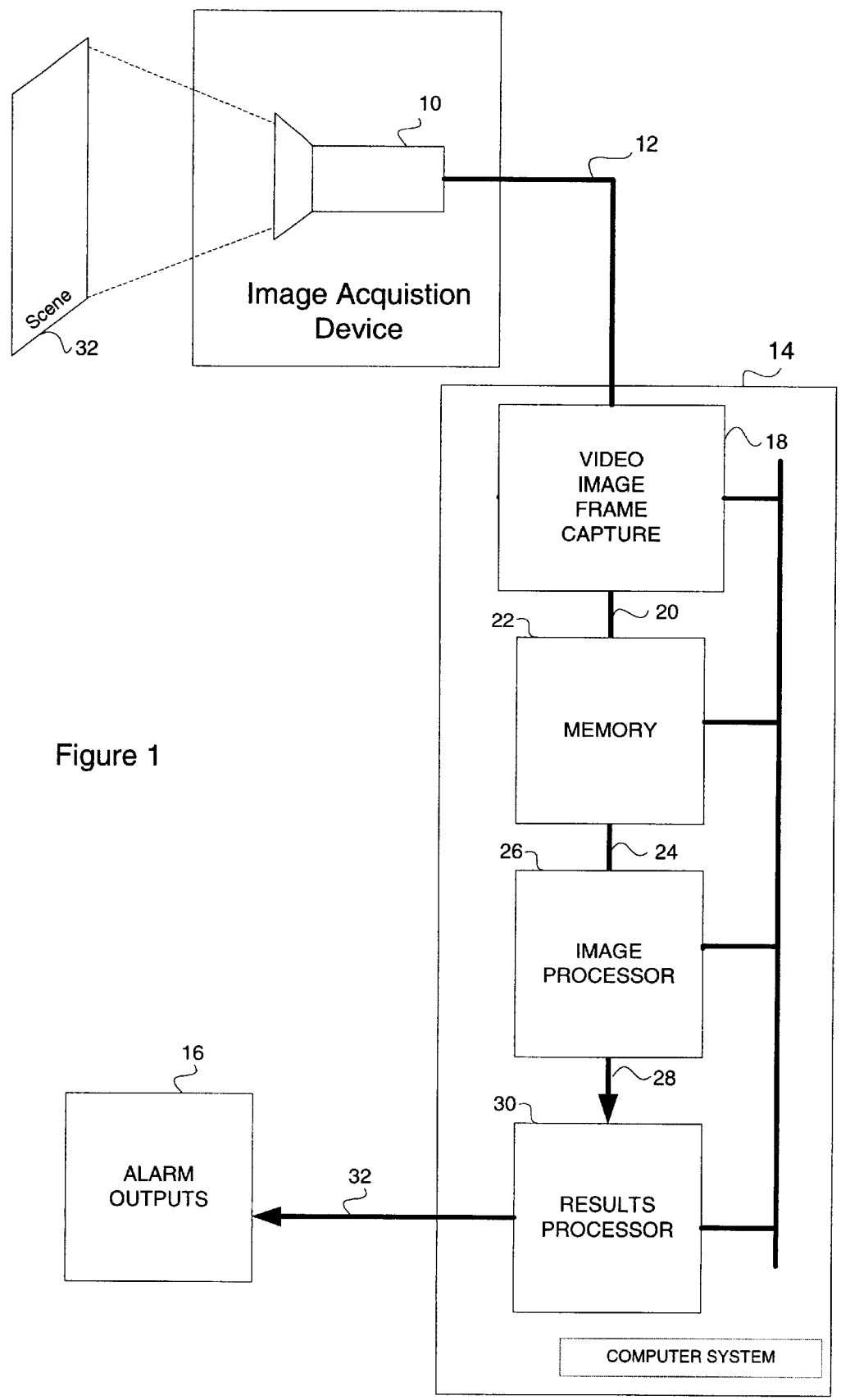
FIG. 1 is a functional block diagram of a video safety system, according to the invention.

A vision system implemented in a security and safety embodiment according to the invention is illustrated in FIG. 1. The system incorporates an image acquisition device 101, comprising at least one camera 10, and a light source for illuminating a viewed area. The camera 10 sends a video signal via signal cable 12 to a video safety and security processor 14. The camera 10 is focused on a scene 32 to be monitored. The video safety and security processor 14 includes a video image frame capture device 18, image processor 26, and results processor 30, all of which are connected to a memory device 22.

Generally, digitized video images 20 from the video image capture device 18, such as a 8100 Multichannel Frame Grabber available from Cognex Corp, Natick, Mass., or other similar device, are stored into the memory device 22. The image processor 26, implemented in this illustrative embodiment on a general-purpose computer processor, receives the stored digitized video images 24 and generates a 2-D data set 28. The 2-D data set 28 is delivered to the results processor 30 which generates results data 32, as described in detail hereinafter. The results data 32 effect results as a function of the application, and may, for example, be fed to the alarm output 16.

In operation, the video signals from the image acquisition device 101 are digitized by the video image frame capture device 18, and stored into the memory device 22 for further processing. The video image frame capture device 18 includes digitizing circuitry to capture the video image input from the image acquisition device 101 and convert it at a high resolution to produce a digital image representing the two-dimensional scanned video image as a digital data set. Each data element in the data set represents the light intensity for each corresponding picture element (pixel). The digitized image generated from the camera is temporarily stored in memory 22 as it awaits further processing by the low-pass filter or the comparison process. The images are stored in a memory buffer whose size is determined by the order of the filter. The memory buffer is used for storing previous outputs and previous inputs of the filter process.

Figure 2:
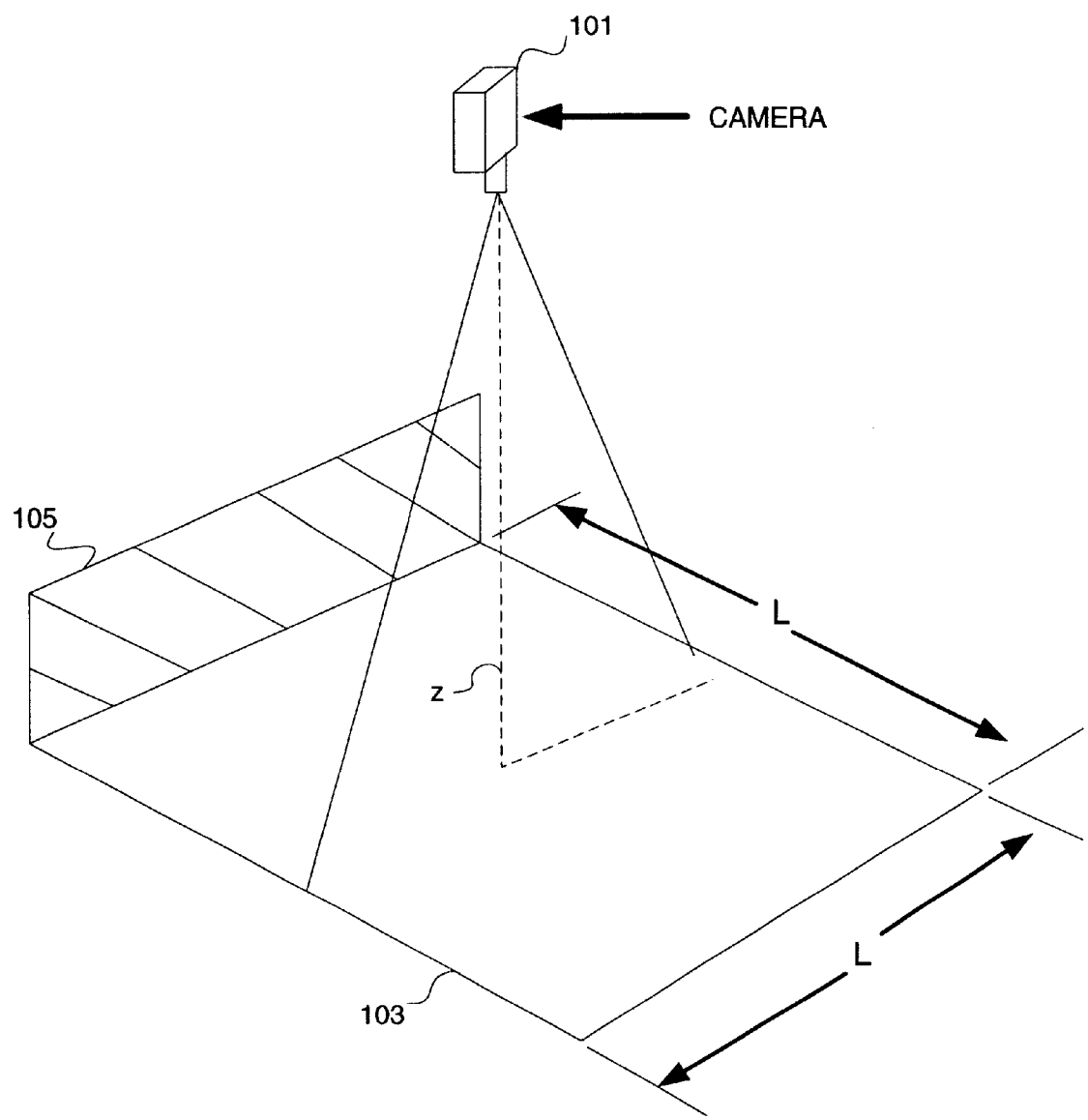
FIG. 2 is an illustration of a camera arrangement adapted for use in acquiring images for processing according to the invention.

The image acquisition device 101 in the illustrative embodiment comprises an arrangement, as illustrated in FIG. 2, for acquiring image information. In the illustrative arrangement, a camera 101 is mounted above a target area 103 adjacent to a hazardous area 105. The geometry of the camera mounting height Z above the target area is determined by the size of the target area, the focal length of the camera, and the size of the CCD. In an illustrative embodiment, a lens of $f=1.8$ mm is used with a charge-coupled device (CCD) image transducer ⅓ of an inch square. This permits viewing a square target area with a side L of 8 meters from a height of 3 meters. The corresponding pixel size, assuming 640 pixels across the CCD device, can be calculated as 12.5 mm. Given a desired resolution for a 150 mm object at the level of the target area (i.e., the floor), this means that 12 pixels would be changed at the floor level, or 24 pixels at half the distance to the floor, 1.5 meters high.

Two primary constraints imposed by the application are the size of the area protected and the maximum permitted speed of an object to be detected. The desired system response time for initiating an alarm can then be determined, since a moving object must not travel from the perimeter of the target area to the hazardous zone before safety steps can be completed. A realistic maximum for object velocity is dictated by the application. The estimation of system response time has to take into consideration the time necessary to capture, transmit, and process the image in which the object first appears outside the target perimeter, in order to properly issue the alarm condition. In an illustrative embodiment, the camera acquires and integrates an image at 30 Hz, or 33.33 ms (referred to as time A) and the acquired image is digitized in another 33.33 ms. A processing engine having a processing time of 33.33 ms is also implemented. Therefore, if a number of images (n) must be captured, digitized and processed, the minimum response time is (n+2)A, or 100 ms for a single frame. However, in an illustrative embodiment, the number of frames necessary for proper operation may be as many as 4, giving a worst-case response time of 200 ms. The distance traveled by the maximum-speed object in the actual response time is 340 mm. Since the viewed area is 8 m sq., the actual hazardous zone is 7.32 m sq.

Figure 3:
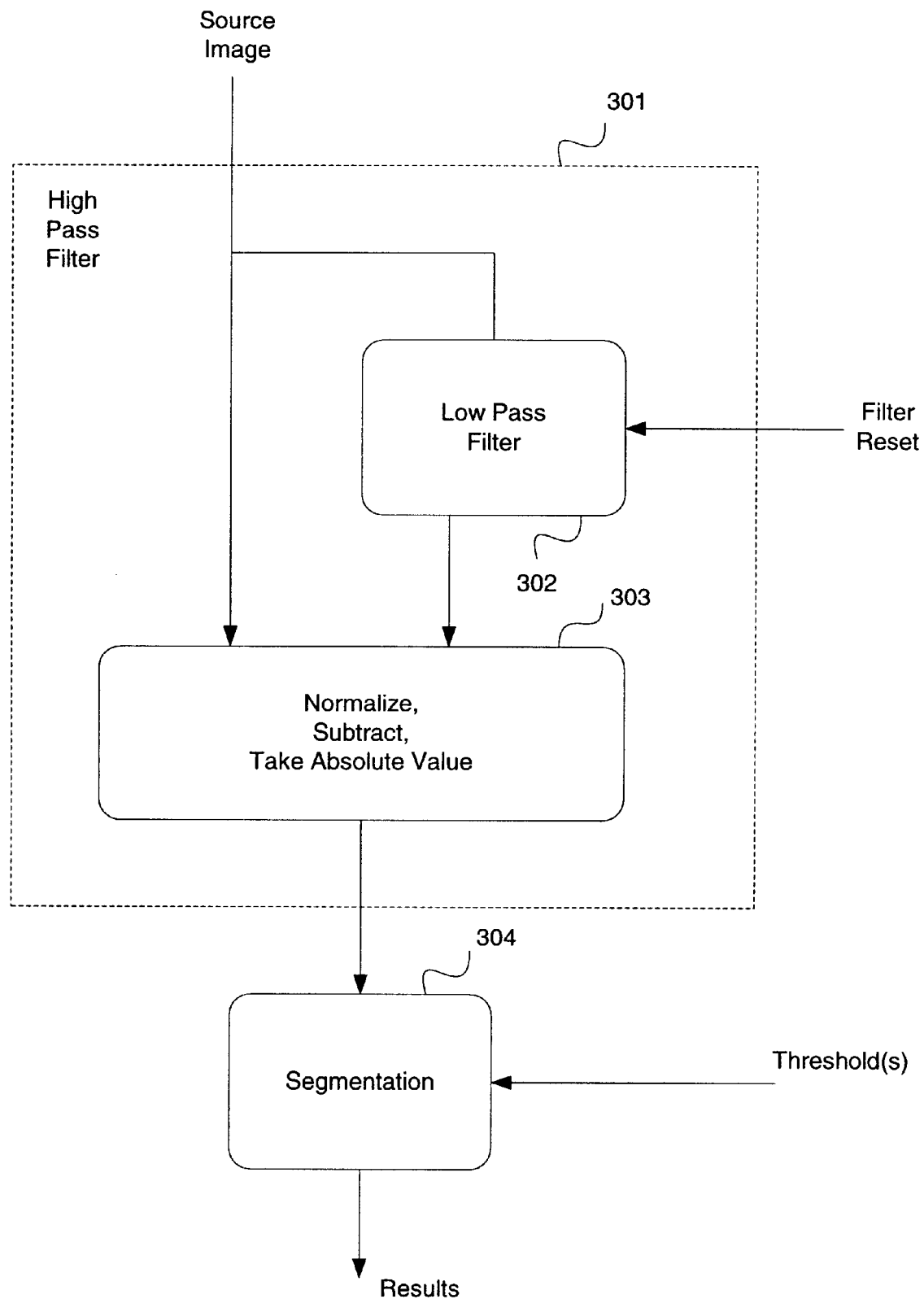
FIG. 3 is a flow diagram illustrating operation of the video safety system according to one illustrative embodiment of the invention.

A pre-processing procedure is used to detect when there is not enough light to create a valid source image, such as when a lens-cap is placed on the camera, or there is insufficient light for operating the system. FIG. 3 is a diagram of an illustrative embodiment of the invention in which a source image is fed to high-pass filter 301 and the filtered output is further processed for segmentation 304 to generate the alarm results. The high-pass filter 301 further comprises a resettable low-pass filter 302 including a reset function which resets the previous inputs and outputs to zero. The model image from the low-pass filter is then compared against the latest source image, using a digital subtraction step 303 and the absolute value of a change is produced as the output of the high-pass filter. These conditions can be forwarded directly to the operator in the form of system malfunction warning indicators, or system failsafe shutdown, or other results dictated by the application.

The low-pass filter 302 creates an image by evaluating a fixed number of previous input and output images. The number of images depends upon the order of the filter. Each pixel is the input to a digital signal processing filter that includes weighting factors. The filter output depends upon the current input, the previous inputs, and the previous outputs. Such filters are known in the art, such as described by James H. McClellan, Ronald W. Schafer and Mark A. Yoder in DSP First: A Multimedia Approach, Prentice Hall, which is incorporated herein by reference. In an illustrative embodiment, a first-order recursive IIR (infinite impulse-response) filter that has the following filter equation:

$$y(n)=(l-k)*y(n-1)+(k)*x(n)$$

where  y(n)   is the low pass filtered output pixel in the current frame n
       y(n-1) is the low pass filtered output pixel in the previous frame n-1
       x(n)   is the input pixel in the current frame n (Src)
       k      is the filter coefficient Note that the filter co-efficient for x(n−1), the previous input, is zero and this factor is thus omitted from the equation.

The result of the low-pass filtering is an image of what the target scene contains, based upon the images previously captured and filtered. This filtered image becomes the stable baseline against which sudden changes are measured. A low-pass filtering arrangement as described removes much of the noise that occurs at high-frequencies, such as flickering lights, and machine vibrations, while simultaneously adapting to slow changes in the source images, such as a setting sun. Note that after each process cycle the oldest inputs and outputs are purged from the memory buffer to make way for the newest captured input and filter output.

Once a stable baseline image has been filtered and captured to create the currently valid filtered image in the low-pass filter, the next source image can be subtracted 303 from the filtered image to detect any pixels that changed from the filtered image. Prior to the subtraction it may be desirable to normalize the input image with respect to the low pass filtered output or vice-versa. The gray levels of the pixels in the high-pass image are proportional to the rate at which the scene being imaged changes with time. Because the system must detect objects that may be lighter or darker than the model image, an absolute value of the changes is also calculated and this becomes the output of the high-pass filter. In effect, any high-frequency change will be instantly passed through to the segmentation process 304.

The segmentation process 304 is used for determining the cumulative madnitude of contiguous changes in the present source image when compared with the filtered image. Segmentation refers to the process of identifying pixels forming a contiguous area ("blob" analysis), and characterizing a blob according to its size. For the purpose of quickly recognizing a 150 mm object approaching a dangerous area, it is sufficient to identify the size of a contiguous blob of pixels that have changed, without any particular indication of its location in the scene. This process can be implemented by a number of methods known in the art, such as those described by Rafael C. Gonzalez and Paul Wintz in Digital Image Processing, Second Edition, from Addison-Wesley Publishing Company.

In an illustrative embodiment, segmentation may be performed very efficiently using a "watershed" process which quickly determines the location and size of a change by "filling in" valleys that appear between change gradients. As described in L. Vincent and P. Soille, "Watersheds in digital spaces: an efficient algorithm based on immersion simulations," IEEE Trans. Pattern Anal. Machine Intell., 13(6): 583–598, June 1991, which is incorporated herein by reference. The light intensity in pixels of a 2-D image is characterized by gradients, such as increasingly dark or light with respect to the neighboring pixels. Since the output of the high-pass is the absolute value of change from the model image, the segmentation is only concerned with the magnitude of change rather than direction of change.

Assume an image to be a topographical relief with gray levels at any point representing the depth at that point. Now imagine immersing this in a lake of water and piercing a hole at the minima where the valleys touch the water. The water starts filling up the "catchment basins". As soon as the water from one catchment basin is about to spill over to another catchment basin infinitely tall dams called watersheds are positioned at the overflow points. The labeled regions then correspond to the catchment basins and are then compared with a predetermined threshold based on the volume of "water" they can hold. By this or similar methods for detecting the size of a contiguous blob of changed pixels, the changed image is segmented into areas of change and non-change. The advantages of the watershed algorithm over blob analysis are numerous. First only a single volume threshold is used, secondly it uses a late threshold which means that a threshold is only used at the end of the procedure. Furthermore, watershed processing is based on a different criterion. In blob analysis two pixels belong to the same region if and only if they are connected and have a similar gray level value, whereas in the watershed approach they have to be connected and also any water that hits them must fall into the same catchment basin. Additional parameters associated with operation of the system can also be configured, such as the order of the low-pass filter, the minimum amount of light that must be observed in order to permit operation, areas of the target view which should be ignored, and the shape and size of the target area. Other generic parameters can also be included, such as those related to the safety mission of the system (e.g., test mode, display mode for viewing and adjusting the images), and the time of day during which other parameters may change.

Applications of the 2-D vision system will dictate the specific actions to be taken upon occurrence of an alarm condition. The alarm results from the vision system can be conveyed by numerous combinations of means known in the art for computer output, such as creating an electrical, optical or audible output or setting a software flag or interrupt for triggering other computer processes. For example, an electrical output can be connected to hazardous machinery such that a change in the electrical characteristics of the output will signal an alarm condition to the machinery shutdown process. Similarly, an alarm output can be used to trigger the instantaneous deployment of safety guard devices, trigger a warning bell, initiate emergency shutdown or quenching of the hazardous process, create a time-stamped record of the event in a computer log, and capture the digital image of the intruding object. Furthermore, an application may require comparison of other results from other sensors, or evaluation of the status of other processes prior to initiating irreversible actions. Multiple, serial or simultaneous alarm conditions may be necessary prior to taking further action in some applications. In an embodiment of the video motion detection invention, a normally closed electrical circuit, tied to the machinery operation circuit, is opened upon alarm condition thereby causing operation of the machinery to halt.

When ambient light is used to illuminate the target area, it is possible that a solid object outside of the target area would cast a shadow into the target area, thus triggering a false alarm. This is especially serious if the illumination around the area being protected is not diffused. To overcome this problem, a separate light source can be arranged near the camera, i.e., overhead, to provide uniform illumination of the target area. Such a light source can also be monochromatic and a band-pass filter corresponding to the wavelength of the light source can be placed on the sensing device to increase the chances of capturing only the light of the monochromatic source intended for the motion detector.

In an alternative embodiment, a light source that produces light in the near-Infrared (IR) area, (approximately 780 to 880 nm), is arranged near the camera such that it illuminates the target area. The camera or other image acquisition device is then configured with a lens to attenuate substantially all light but that in the range emitted by the corresponding near-IR source. In the absence of other IR light sources all shadows are cast outwards, so if the shadow is in the perimeter it is because the intruder is in the perimeter. The advantages of using IR are that it is not visible and is less likely that there will be interference from other IR light sources. One of the goals of the application is to build a low-cost system so the sensing device is a standard CCD sensor without the IR filter (preferably one that peaks as high in the visible range as possible) or a standard CMOS sensor. This is what restricts the range of wavelengths the IR light source to near-IR. One drawback of using IR is the increased cost of the artificial IR illumination.

As described above, the same acquisition of source images, followed by the high-pass/low-pass filtering and segmentation is carried out on images illuminated in the near-IR light. However, an alarm condition will only arise when the change in image is caused by an object that changes the near-IR image. Since many industrial areas are illuminated by cool fluorescent lamps, mercury vapor lamps, or by other lights that do not emit strong spectra in the near-IR region, visible shadows in the target area caused by objects outside the target area will not cause an image to be captured by the video motion detector system. Conversely, any opaque object falling between the near-IR illumination source and the target area will create a dramatic change in the near-IR image of the target area. Also, in the absence of other IR light sources all shadows are cast outwards, so if the shadow is in the perimeter it is because the intruder is in the perimeter.

Many applications will be indoors, where sunlight will not be a major component of the ambient light. Even if there is sunlight or other sources of near-IR in the vicinity of the system, their light can be shaded or filtered to attenuate near-IR without losing any of the visible benefits. This arrangement results in rejection of false alarms caused by shadows that would otherwise have been perceived as objects. Another advantage of this embodiment is that it provides a reasonably uniform illumination across a large target area, which is desirable for achieving uniform coverage in detecting objects.

In a variation on this embodiment, the illumination source located near the camera can be a visible light of sufficient brightness to overcome any externally originated shadows. In still another variation, the illumination source and the camera can be adapted to transmit and receive, respectively, a particular wavelength of light appropriately selected to be distinguishable from the ambient light.

In another alternative embodiment, additional processing of texture in the viewed target scene can be carried out to reduce the potential of permitting a low-contrast object to penetrate the target area. This alternative embodiment also results in enhanced rejection of false alarms caused by shadows of ambient light falling within the sensitive target area. The term "low contrast" means that the object color is not readily distinguishable from the color of the background. As diagramed in FIG. 4, high-pass filter 301 is configured to process source images, resulting in a high-pass image output to segmentation 304 and a low-pass image output to a shadow elimination process 401. The same filtering 301 and segmentation 304 steps mentioned above are applied to the stream of source images, except that a mask image is constructed from the output of the segmentation step 304 in which all the areas that correspond to the blobs in the high-pass filtered image are marked PASS and the rest of the areas are marked CLEAR. Next an edge detection step 403 is performed on the output of the low pass filter 302 with the given mask image. Points in the low pass filtered image where the gray level changes significantly and which are marked as PASS in the corresponding locations in the mask are recorded. The information recorded is the (x, y) position, magnitude and the angle of each edge point. The low pass filtered image can be considered for all practical purposes the background image of the target area, so these edge points should correspond to the texture in the background.

A gradient computation 405 is also done on the source image. The gradient involves the computation of the magnitude (called the magnitude image) and the direction (called the angle image) of the first derivative at each point in the image. This is achieved by convolution with standard Sobel kernels, as are known in the art (See e.g. Gonzalez and Wintz, supra). Next, a texture comparison step 407 is performed wherein the magnitude and the angle of the edges that were computed are compared against the magnitudes and the angles in the gradient images at the positions obtained from the edges. If the blob is a shadow then the observed texture should have not changed significantly, and an almost perfect comparison is produced. On the other hand of the blob corresponds to the image of an intruder, the texture in the background would get occluded, thus producing a lot of discrepancy in the comparison step and an alarm condition is set.

This embodiment requires having a textured background with a high spatial frequency content, and preferably a texture that is unlike objects likely to intrude in the protected area. Examples of visual textures include regular geometric patterns such as circles or lines, and irregular patterns such as carpets or rough flooring. However, the resolution of the digitized image must be factored in when considering the geometry of the textured surface.

In an illustrative embodiment, based upon a resolution in the target plane of 150 mm (approximately 0.6 inches), the texture pattern comprises a single stripe of reflective adhesive tape approximately 5 cm wide and arranged around the target perimeter. Since the tape has two parallel edges that are perpendicular to the dangerous direction of motion (i.e., toward the hazardous machine), and a normal human foot is rounded at each end (a common and significant intruder object), alarm results are highly likely upon intrusion. Additional strips of similar nature, with appropriate spacing, can be disposed at the edge of the viewed target area for additional textural context, thus enhancing early detection of intruders.

The advantages of this embodiment is that there is always contrast with respect to the background (assuming there is enough ambient light). Therefore it is possible to completely eliminate false negatives caused by low contrast objects and greatly reduce the false positives caused by shadows. One major disadvantage is requiring the imposition of texture in the background. However, it is not necessary to decorate the entire area,—just imposing texture in the perimeter is sufficient as once the intruder enters the area, the perimeter is constantly occluded due to the geometry of the camera relative to the perimeter. One other disadvantage is requiring the area to be uniformly well lit which can be a challenge for large areas. In addition, this method is more computationally complex than other embodiments described earlier due to the shadow elimination step.

Figure 4:
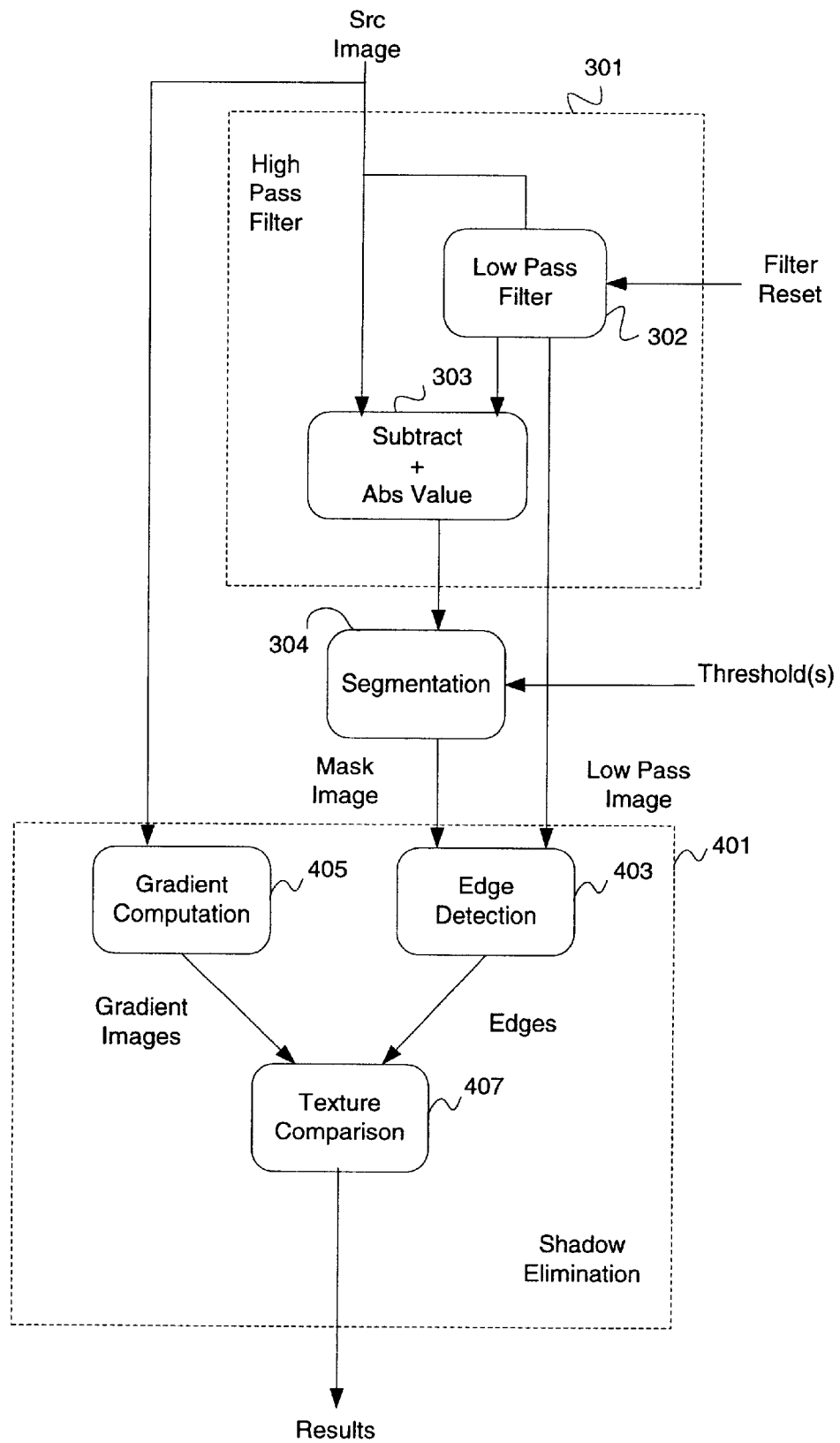
FIG. 4 is an illustration of an alternative arrangement adapted for superior shadow elimination using a textured background.

In an alternative embodiment of this textural processing system, spatial texture can be implemented using surfaces that have different IR reflectivity. A light source that produces light in the near-Infrared (IR) area, (approximately 780 to 880 nm), is arranged near the camera such that it illuminates the target area. The camera or other image acquisition device is then configured with a lens and a filter to attenuate substantially all light but that in the range emitted by the corresponding near-IR source. The same processing as diagrammed in FIG. 4, is carried out on images illuminated in the near-IR light, namely acquisition of source images, followed by the high-pass/low-pass filtering, segmentation, and shadow elimination. The arrangement of a self-contained light source reduces the reliance upon uniform ambient illumination and increases the rejection of false alarms caused by images containing shadows of objects outside of the target area. Note that Near-IR behaves like visible light relying on reflected light, so the duct tape approach will work equally well under visible or near-IR light.

Furthermore, in an illustrative embodiment of this alternative, the background texture does not need to be visible, since no visible light is being interpreted by the system. Specially formulated dyes and pigments are visible only under illumination by near-IR light sources. Such dyes or pigments can be applied as "invisible" stripes of paint or imprint on the floor of the target area. Texture can also be imposed by using any material that fluoresces under IR light adjacent to areas that do not fluoresce at all. For example, paint such as a thermo-chromic or infrared-readable ink, available from Gans Ink & Supply, Security and Specialty Inks Division, Fairfax, Va. 22030, can be applied to commonly available self-adhesive tape and deployed as stripes around the perimeter of the target safety area. Similarly, the paint can be stenciled on the floor as stripes or squares having edge spacing no less than approximately the image resolution at the floor plane, i.e., no less than 150 mm. This implementation has the extra advantage of reducing the visual indications of potentially overlapping safety zones. However, the presently available pigments must be re-applied periodically to maintain their maximum near-IR luminance characteristics. Also, in the interest of increased safety awareness, additional signs, barriers, or other warnings may be required in order to visually signify the presence of the invisible safety target zone.

In another alternative embodiment, additional processing of images under a combination of lighting sources can be carried out to provide enhanced rejection of false alarms caused by shadows of ambient light falling within the sensitive target area. A shadow appearing from ambient light should also appear as a shadow under near-IR, and thus cancel each other out. In this embodiment, a light source that produces light in the near-Infrared (IR) area, (approximately 780 to 880 nm), would be arranged near the camera such that it illuminates the target area. The camera or other image acquisition device is then configured permit reception of ambient light and also light in the range emitted by the corresponding near-IR source. The near-IR light source would then be modulated such that it is intermittently turned on and off in synchrony with acquisition of corresponding images of the target scene with a very short alternating interval such that paired images are collected in as close a time as possible. Images collected under ambient light then form a channel 1 stream of images and images collected under near-IR illumination form a channel 2 stream of images for further processing. These 2 channels can be obtained from two separate cameras or a single camera (for example the odd and the even field).

Figure 5:
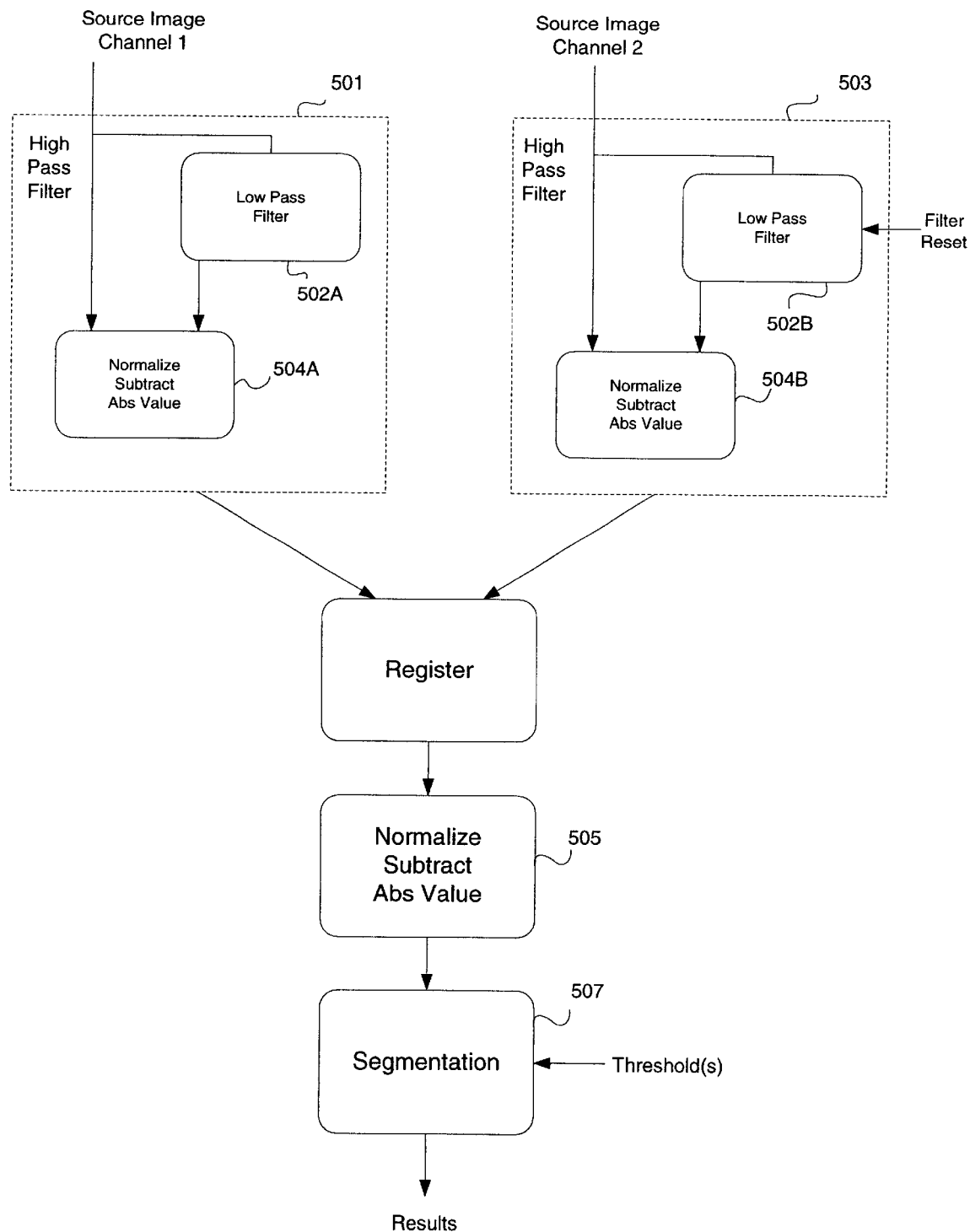
FIG. 5 is a flow diagram of another alternative embodiment of the invention using simultaneous processing of multiple image channels.

As diagrammed in FIG. 5, the image stream in each channel would be filtered in parallel, with channel 1 being processed by a first high-pass filter 501 and channel 2 being processed by a second high-pass filter 503. Each high-pass filter 501, 503 contains processing for low-pass filtering 502 and comparison processing 504. The absolute value of the outputs each comparison process 504A and 504B would then be further compared 505 and the absolute value of the subtraction further processed for segmentation 507, including threshold alarm determination, as described earlier. The two channels should also be spatially registered with respect to each other, perhaps by a setup calibration, prior to the subtraction step. Source images in channel 1 would be collected at substantially the same time as corresponding source images in channel 2 such that the channel 1 image of an ambient light shadow falling within the target zone would be cancelled by the appearance of the simultaneous image of the shadow in channel 2 under near-IR illumination. Since the shadow image is cancelled, no object is detected in the segmentation process and no false alarm arises. Conversely, an intruder will be strongly visible only in images captured with the IR light on. The difference image is then segmented and blobs compared with a threshold as described above.

In the interest of providing a fail-safe system, dual or multiple redundant and independent light sources, image acquisition devices and their corresponding processor, memory, and results apparatus can be supplied and operated simultaneously. The system would then be configured such that an intruder object detected by any of the multiple redundant video motion sensors would trigger the appropriate alarm condition.

Although the invention is described with respect to an identified method and apparatus for image acquisition, it should be appreciated that the invention may incorporate other data input devices, such as digital cameras, CCD cameras, or laser scanning devices that provide high-resolution two-dimensional image data suitable for 2-D processing of a gray-scale intensity component.

Similarly, it should be appreciated that the method and apparatus described herein can be implemented using specialized image processing hardware, or using general purpose processing hardware adapted for the purpose of processing data supplied by any number of image acquisition devices. Likewise, as an alternative to implementation on a general purpose computer, the processing described hereinbefore can be implemented using application specific integrated circuitry (ASIC), programmable circuitry and the like.

Furthermore, although particular divisions of functions are provided among the various components identified, it should be appreciated that functions attributed to one device may be beneficially incorporated into a different or separate device. Similarly, the functional steps described herein may be modified with other suitable algorithms or processes that accomplish functions similar to those of the method and apparatus described.

Although the invention is shown and described with respect to an illustrative embodiment thereof, it should be appreciated that the foregoing and various other changes, omissions, and additions in the form and detail thereof could be implemented without changing the underlying invention.

What is claimed is:

1. A method of detecting an intruding object in a space comprising the steps of:
   applying a textured background on said space;
   acquiring a digital source image of said space;
   generating a background image by processing said source image using a low pass filter;
   comparing said source image with said background image using a digital subtraction step to form a difference image;
   constructing a mask image by segmenting said difference image;
   combining said mask image with said background image to form a masked background image;
   performing an edge detection procedure on said masked background image to determine edge data;
   performing a gradient computation procedure on said source image to generate a gradient image; and
   performing a texture comparison procedure on said gradient image and said edge data.

2. The method according to claim 1 wherein said steps of generating and comparing comprise a high pass filter process.

3. The method according to claim 2 wherein said mask image comprises indications defining pass areas as blobs from said high pass filter and defining clear areas as non-blob areas from said high pass filter.

4. The method according to claim 1 further comprising the step of taking an absolute value of said difference image to form an absolute difference image, wherein said step of segmenting is performed on said absolute difference image rather than on said difference image.

5. The method according to claim 1 wherein said step of segmenting further comprises the steps of:
   characterizing contiguous related pixels;
   determining areas of contiguous related pixels; and
   comparing said areas with threshold limits.

6. The method according to claim 1 further comprising the step of providing notification output if said texture comparison procedure finds a discrepancy between said edge data and said gradient images which discrepancy exceeds a predetermined threshold.

7. The method according to claim 1 wherein said step of segmenting is performed using a watershed process.

8. The method according to claim 1 further comprising the step of illuminating said space with diffuse light.

9. The method according to claim 2 wherein said diffuse light is provided by a light source mounted proximate to said camera.

10. The method according to claim 1 wherein said source image comprises a set of time sequenced images.

11. The method according to claim 1 further comprising a step of illuminating said space with near IR light.

12. The method according to claim 11 wherein said step of acquiring a digital source image further comprising a step of filtering light reflected from said space using an IR bandpass filter.

13. The method according to claim 11 wherein said textured background comprises texture having pre-selected IR reflectivity.

14. The method according to claim 1 wherein said textured background comprises a high spatial frequency texture.

15. The method according to claim 1 wherein said textured background comprises a perimeter of said space.

16. The method according to claim 1 wherein said step of performing a gradient computation procedure comprises computing a magnitude and direction of a first derivative at each point in said source image.

17. The method according to claim 1 wherein said step of performing a gradient computation procedure comprises convolving said source image with standard Sobel kernels.

18. A machine vision intrusion detection apparatus comprising:
   at least one image acquisition device arranged to acquire an image of a space;
   at least one light source arranged to illuminate at least part of said space;
   at least one video processor in communication with said at least one image acquisition device;
   wherein said at least one video processor further comprises:
      an image processor component in communication with said image acquisition device;
      wherein said image processor component further comprises a low pass filter component in communication with said image acquisition device and receiving a source image therefrom;
      a comparison component in communication with said image acquisition device and receiving said source image therefrom, said comparison component also in communication with said low pass filter component and receiving a background image therefrom;
      a segmentation component in communication with said comparison component and receiving a difference image therefrom;
      an edge detection component in communication with said segmentation component and receiving a mask image therefrom, said edge detection component also in communication with said low pass filter and receiving a background image therefrom;
      a gradient computation component in communication with said image acquisition device and receiving a source image therefrom; and
      a texture comparison component in communication with said edge detection component and receiving edge data therefrom, said texture comparison component also in communication with said gradient computation component and receiving gradient images therefrom.

19. The apparatus according to claim 18:
   wherein said light source comprises a near IR light source; and
   wherein said image acquisition device is configured with an IR band-pass filter to acquire reflected near IR light and reject light outside of the near IR frequency band.

* * * * *